Figure 3:
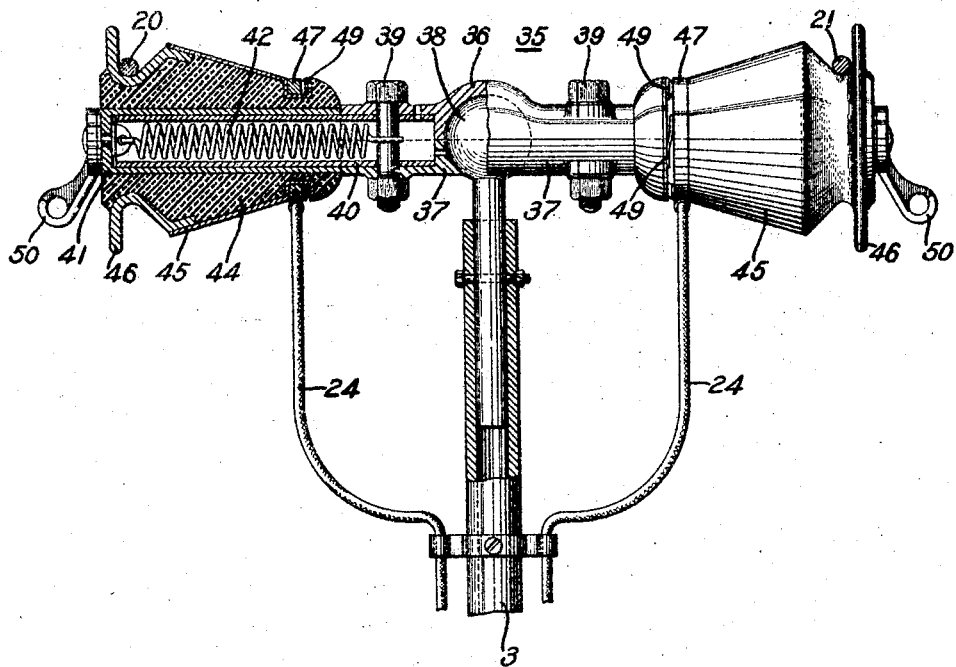

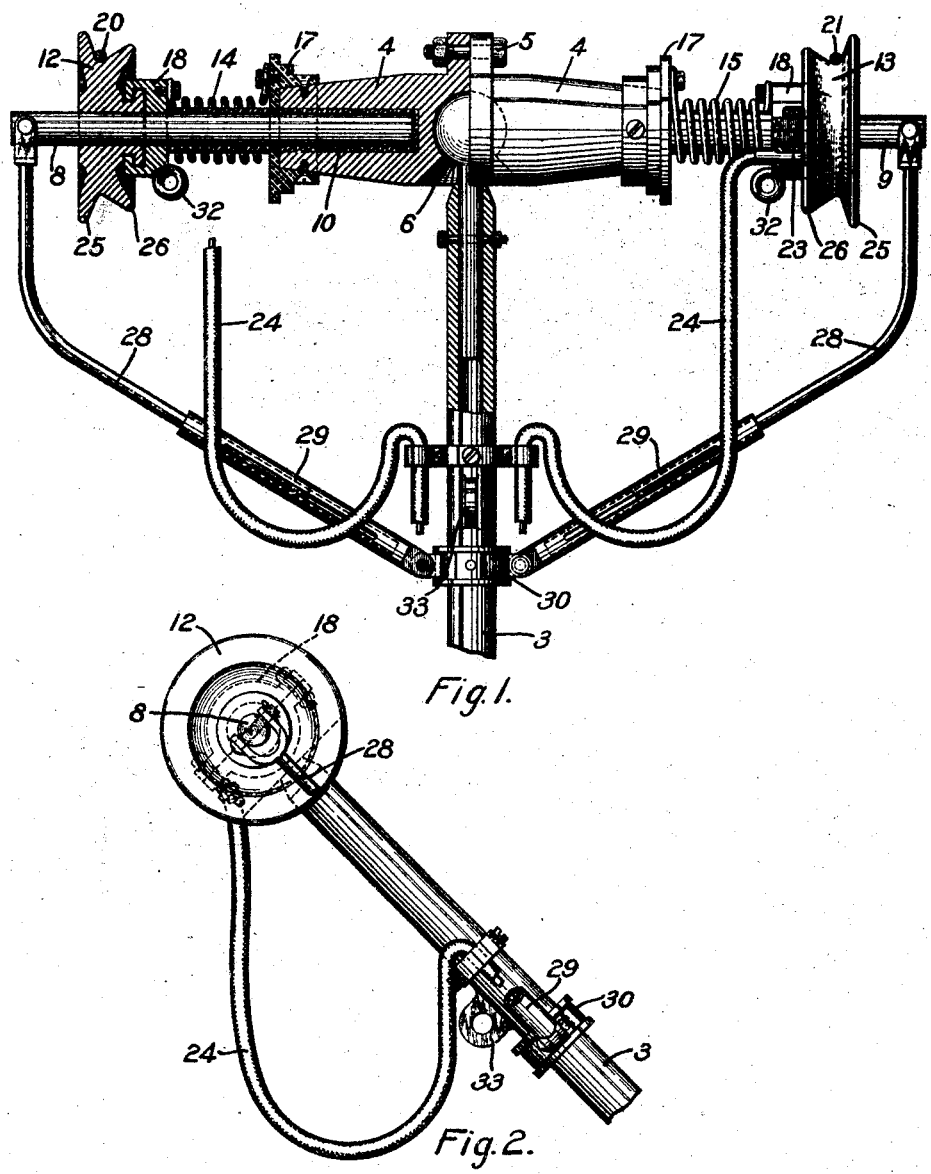

Feb. 16, 1926.  
C. C. OWENS ET AL  
1,572,946  
TROLLEY-POLE  
Filed Dec. 17, 1921  
2 Sheets-Sheet 2

WITNESSES:

INVENTORS  
Charles C. Owens and  
Ralph L. Hermann.  
BY  
ATTORNEY

Patented Feb. 16, 1926.

1,572,946

UNITED STATES PATENT OFFICE.

CHARLES C. OWENS AND RALPH L. HERMANN, OF DETROIT, MICHIGAN, ASSIGNORS TO WESTINGHOUSE ELECTRIC & MANUFACTURING COMAPNY, A CORPORATION OF PENNSYLVANIA.

TROLLEY POLE.

Application filed December 17, 1921. Serial No. 523,097.

*To all whom it may concern:*

Be it known that we, CHARLES C. OWENS, a citizen of the United States, and a resident of Detroit, in the county of Wayne and State of Michigan, and RALPH L. HERMANN, a citizen of the United States, and a resident of Detroit, in the county of Wayne and State of Michigan, have invented a new and useful Improvement in Trolley Poles, of which the following is a specification.

Our invention relates to current collectors and particularly to those of the trolley type wherein electrical energy is supplied by means of a pair of trolley wires to a vehicle.

Our invention has for one of its objects the provision of an improved means for mounting a pair of current collectors, or contact devices, on a single pole in such manner that they may be maintained in proper relation to a pair of trolley wires, regardless of slight irregularities in alinement, as between the current collectors and the wires or of the wires themselves.

Another object of our invention is the provision, in a current collector of this type, of means whereby the tendency of the wires to bind in the grooves of the current collectors when the current collectors are angularly displaced with respect thereto, is reduced.

Still another object of our invention is to simplify and improve current collectors of the type hereinafter designated.

Our device is especially adapted for use in connection with trackless trolleys, or trolley busses, wherein the vehicle must deviate frequently from its normal path.

As shown in the accompanying drawings, Figure 1 is a front view, partially in elevation and partially in section, of our device, Fig. 2 is a view thereof, partially in side elevation and partially in section, and Fig. 3 is a view, similar to Fig. 1, of a modified form of our invention.

Referring particularly to Figs. 1 and 2, our device is shown as employed in connection with a trolley pole 3 (only a portion of which is shown) that may be mounted upon a trolley base in the usual manner and normally biased upwardly into engagement with the trolley wires.

A cross head 4, which is mounted upon the upper end of the pole 3, is in two parts that are secured together by bolts 5. The cross head 4 and the pole 3 are connected by a ball-and-socket joint 6 so that the cross head has universal movement about the end of the trolley pole.

A pair of shafts 8 and 9 are supported within the cross-head 4 and are insulated therefrom by means of bushings 10. The shafts 8 and 9 support trolley wheels 12 and 13, respectively. The wheels 12 and 13 are slidable upon their respective shafts and are yieldingly maintained in the positions illustrated by means of tension springs 14 and 15, respectively. The springs 14 and 15 are connected to collars 17 on the cross head and to collars 18 that have a tongue-and-groove connection with the trolley wheels 12 and 13, the collars being split, as indicated in Fig. 2, to permit of convenient assembly of the parts.

The springs 14 and 15 tend to return the wheels 12 and 13 to their normal positions whenever such wheels are spread farther apart than here shown, as when the cross head 4 is turned diagonally of the trolley wires 20 and 21. This action of the tension springs 14 and 15 has a tendency to maintain the cross head in proper relation to the trolley wires, that is, at right angles thereto.

The collars 18 are provided with terminal connections 23 through which current is conducted, by means of conductors 24, to the apparatus within the trolley car.

The trolley wheels 12 and 13 are each provided with a flange 25 of normal diameter and a flange 26 of relatively small diameter. This form of wheel has less tendency toward binding of the wires between the flanges of the respective wheels whenever the cross head is turned diagonally of the wires, as when the vehicle is driven outside its normal path beneath the trolley wires. The relatively high outside flanges of the trolley wheels maintain the wheels in engagement with the trolley wires, while the wires may slide radially on the smaller inclined flanges 26.

In order to prevent the wires 20 and 21 from becoming entangled with the under side of the cross heads, and current collectors, we provide arms 28 that are pivotally supported upon the outer ends of the shafts 8 and 9 and have sliding engagement with sleeve members 29 that are pivoted upon a collar 30 which is rotatably supported upon the pole 3. This construction does not interfere with the universal movement of the cross head 4 upon the trolley pole 3 and serves as an effective guard to prevent entanglement of the lower portions of the apparatus with the trolley wires.

The collars 18 are each provided with an eye 32 that may be engaged by a hook stick to manipulate the wheels so that they may be guided into engagement with the wires 20 and 21. Ordinarily, the current collectors may be guided into place through movement of but one of the collars 18. An eye 33 (Fig. 2) is provided on the trolley pole whereby it may be drawn downwardly to inoperative position by a rope or a hook, in the usual manner.

In the device illustrated in Fig. 3, a cross-head 35 is mounted upon the trolley pole in somewhat the same manner as is the cross-head 4 of Fig. 1, but the cross-head 35 is made of upper and lower sections 36 and 37 that are recessed to conform to the ball member 38 on the upper end of the pole 3. The parts 36 and 37 are clamped together by means of bolts 39 and are thereby securely maintained in position upon the end of the pole 3.

The sleeve-like members 40 are mounted in the ends of the cross-head 35 and serve as supports for tubular members 41 that have sliding movement thereon. A pair of springs 42 are secured at one end of the sleeve members 41, to yieldingly maintain the inner ends of the sleeve members 41 in abutting engagement with the outer ends of the cross-head members 36 and 37.

A body of insulating material 44 is molded about each of the sleeve members 41 and within a metallic sleeve-like member 45 and an annular member 46. The members 45 are welded, or otherwise secured, at their outer edges to the annular members 46.

The members 44, 45 and 46 function as trolley wheels, or current collectors, the circuit being completed therefrom to the apparatus within the vehicle, through collector rings 47 that are held in spring-pressed relation to the current collectors by means of yielding members 49. Eye members 50 are provided so that the apparatus may be manipulated by a rope or a hook-stick.

It will be seen that the inclined surfaces of the members 45 provide convenient means for sliding the collectors into proper position under the wires and that the wires 20 and 21 will tend to be returned to position within the grooves of the members 46 in case they become accidentally dislodged therefrom and be thrown inwardly.

From the foregoing, it will be seen that we provide an apparatus that will readily follow irregularities in alinement of the trolley wires and will also permit of a considerable radius of movement by the vehicle without causing disengagement of the trolley wheels and their respective wires.

It will be apparent that other forms of collectors, such as shoes, may be employed instead of the trolley wheels and that various modifications may be made both in details and in the general arrangement without departing from the spirit and scope of the invention as defined in the accompanying claims.

We claim as our invention:

1. The combination with a trolley pole, of a cross-head pivotally supported thereon, two current collectors disposed at opposite sides of the trolley pole, and a guard arm extending from each end of the cross-head to a point upon the trolley pole, said guard arms each comprising two telescopic sections.

2. The combination with a trolley pole, of a cross-head pivotally supported thereon, two current collectors disposed at opposite sides of the trolley pole, and a guard arm extending from each end of the cross-head to a point upon the trolley pole, said guard arms each being pivotally supported upon the cross-head and the pole, respectively, and each comprising telescopic sections.

3. The combination with a trolley pole and a cross-head therefor, of a pair of current collectors supported upon the cross-head in spaced relation, and tension springs for normally maintaining the current collectors in predetermined spaced relation.

4. The combination with a trolley pole, of a pair of transversely spaced current collectors supported thereby, each of which is provided with a flange of relatively large radial dimension upon its outer side and a flange of relatively small radial height on its inner side.

5. The combination with a trolley pole, of a pair of transversely spaced current collectors supported thereby, each of which is provided with a flange of relatively large radial dimension on one side and relatively small radial dimension on its other side.

In testimony whereof, we have hereunto subscribed our names this 1st day of December, 1921.

CHARLES C. OWENS.
RALPH L. HERMANN.